United States Patent
Lee

(10) Patent No.: US 6,516,418 B1
(45) Date of Patent: Feb. 4, 2003

(54) PORTABLE COMPUTER HAVING UNIVERSAL SERIAL BUS PORTS CONTROLLED POWER SUPPLY AND A METHOD OF THE SAME

(75) Inventor: Byeong-Chang Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/360,115

(22) Filed: Jul. 23, 1999

(30) Foreign Application Priority Data

Jul. 23, 1998 (KR) .............................. 98-29727

(51) Int. Cl.[7] ................................................ G06F 1/26
(52) U.S. Cl. ....................................... 713/320; 713/324
(58) Field of Search ................................ 713/320, 340, 713/300, 324, 330

(56) References Cited

U.S. PATENT DOCUMENTS

| | | |
|---|---|---|
| 3,740,569 A | 6/1973 | Carcia |
| 4,373,183 A | 2/1983 | Mean et al. |
| 4,395,710 A | 7/1983 | Einolf, Jr. et al. |
| 4,528,662 A | 7/1985 | Floyed et al. |
| 4,907,183 A | 3/1990 | Tanaka |
| 4,980,836 A | 12/1990 | Carter et al. |
| 5,036,251 A | 7/1991 | Lee |
| 5,163,124 A | 11/1992 | Yabe et al. |
| 5,237,258 A | 8/1993 | Crampton |
| 5,257,163 A | 10/1993 | Buist et al. |
| 5,448,554 A | 9/1995 | Van Steenbrugge |
| 5,465,366 A | 11/1995 | Heineman |
| 5,485,458 A | 1/1996 | Oprescu et al. |
| 5,587,876 A | 12/1996 | O'Brien et al. |
| 5,675,364 A | 10/1997 | Stedman et al. |
| 5,689,574 A | 11/1997 | Heirich et al. |
| 5,730,512 A | 3/1998 | Heirich |
| 5,758,171 A | 5/1998 | Ramamurthy et al. |
| 5,767,844 A | 6/1998 | Stoye |
| 5,799,196 A * | 8/1998 | Flannery ..................... 713/320 |
| 5,877,745 A | 3/1999 | Beeteson et al. |
| 5,884,086 A | 3/1999 | Amoni et al. |
| 5,890,015 A | 3/1999 | Garney et al. |
| 5,914,877 A | 6/1999 | Gulick |
| 5,938,770 A | 8/1999 | Kim |
| 6,009,529 A * | 12/1999 | Park ............................ 713/320 |
| 6,067,628 A * | 5/2000 | Krithivas et al. ........... 713/340 |
| 6,253,267 B1 * | 6/2001 | Kim et al. ................... 710/103 |
| 6,253,329 B1 * | 6/2001 | Kang .......................... 713/300 |
| 6,338,143 B1 * | 1/2002 | Shimazaki .................. 713/340 |
| 6,345,364 B1 * | 2/2002 | Lee ............................. 713/324 |
| 6,357,011 B2 * | 3/2002 | Gilbert ....................... 713/300 |

FOREIGN PATENT DOCUMENTS

| | | |
|---|---|---|
| EP | 0317072 | 5/1989 |
| JP | 62-277440 | 5/1989 |

OTHER PUBLICATIONS

Craig Matsumoto, "Cypress Broadens Controller Line for Universal Serial Bus", *EETIMES*, issue 952, May 5, 1997, p. 46.

* cited by examiner

*Primary Examiner*—Peter Wong
*Assistant Examiner*—X. Chung-Trans
(74) *Attorney, Agent, or Firm*—Robert E. Bushnell, Esq.

(57) ABSTRACT

A portable computer system with universal serial bus (USB) port or ports and a method for controlling power of the universal serial bus (USB) port is described. When the main power of the portable computer system is supplied from a battery rather than an alternating current (AC) adapter, the power of the universal serial bus (USB) port is automatically shut down. In addition, the power of the universal serial bus (USB ) port is completely shut down while the universal serial bus (USB) port is not used in response to a setting state of the universal serial bus (USB) port, thereby reducing unnecessary power consumption. Further, when an overcurrent is detected from the alternating current (AC) adapter or the battery, the power of the universal serial bus (USB) port is shut down, whereby damage to peripheral devices coupled to the universal serial bus (USB) port can be prevented.

21 Claims, 10 Drawing Sheets

PORTABLE COMPUTER HAVING UNIVERSAL SERIAL BUS PORTS CONTROLLED POWER SUPPLY AND A METHOD OF THE SAME

CLAIM OF PRIORITY

This application makes reference to, incorporates the same herein, and claims all benefits accruing under 35 U.S.C. §119 from my application PORTABLE COMPUTER SYSTEM CONTROLLED POWER SUPPLY OF UNIVERSAL SERIAL BUS AND METHOD OF THE SAME filed with the Korean Industrial Property Office on Jul. 23, 1998 and there duly assigned Ser. No. 29727/1998.

1. Field of the Invention

The present invention relates to a portable computer with a universal serial bus (USB) hub and a method of controlling the power supply of universal serial bus (USB) ports.

2. Background of the Invention

Recently, the demand for battery-powered portable computers has increased rapidly. However, in order to maximize the utility of such battery-powered portable computers, and thus satisfy the needs of users of such battery-powered portable computers, it is becoming increasingly necessary to maximize the time that such computers can be used before it becomes necessary to recharge the battery.

A portable computer exemplary of contemporary practice in the art incorporates a universal serial bus (USB) root hub including one or more universal serial bus (USB) ports. As is well known, universal serial bus (USB) devices are classified into self-powered devices and bus-powered devices. A self-powered universal serial bus (USB) device itself has a power source while a bus-powered universal serial bus (USB) device is supplied with power through a universal serial bus (USB) cable. The universal serial bus (USB) ports of the universal serial bus (USB) root hub are connected with bus-powered universal serial bus (USB) devices, for example, universal serial bus (USB) keyboards, universal serial bus (USB) mouses and universal serial bus (USB) monitors, and are used to connect the specific additional functions to the computer.

The universal serial bus (USB) devices implement the plug and play (PNP) function by use of the power supplied through the universal serial bus (USB) ports. If, however, the portable computer is supplied with the power from a battery, then power management of the computer is very important. Extending the use time of the battery is a significant factor for the portable computer. Since the portable computer always supplies the power to the universal serial bus (USB) ports during use of the battery, the power is unnecessarily consumed although the universal serial bus (USB) devices are not used. Specifically, for a universal serial bus (USB) device, about 100 mA current flows through each universal serial bus (USB) port in a low power state, and about 500 mA current in a high power state.

A circuit configuration of a portable computer system exemplary of contemporary practice in the art with a universal serial bus (USB) port includes a universal serial bus (USB) controller and a universal serial bus (USB) downstream port that is connected with a universal serial bus (USB) device. This portable computer exemplary of contemporary practice in the art is supplied with a direct current (DC) voltage from an alternating current (AC) adapter or a battery through a direct current (DC)/direct current (DC) converter. The universal serial bus (USB) device is suppled with power from the computer via the universal serial bus (USB) port. In the event a universal serial bus (USB)-incompatible device is connected to the universal serial bus (USB) port and so over-current flows from the direct current (DC)/direct current (DC) converter to the universal serial bus (USB) port, an over-current protection circuit blocks off the current path to the universal serial bus (USB) port. The over-current protection circuit exemplary of contemporary practice in the art can perform the foregoing function by means of a fuse or an intelligent over-current protection circuit such as a microcontroller. The intelligent over-current protection circuit detects whether the current supplied from the battery or the alternating current (AC) adapter through the direct current (DC)/direct current (DC) converter to the universal serial bus (USB) port is over-current and transmits detecting data to the universal serial bus (USB) controller. The universal serial bus (USB) controller outputs a control signal when over-current flows, so that the over-current protection circuit shuts the current path down.

In order to solve the foregoing problems, a portable computer can have a function to disable universal serial bus (USB) ports in its initializing steps by setting state of its basic input/output system (BIOS) associated with the unused universal serial bus (USB) devices. However, it can be difficult for an unskilled user to understand and suitably use the function. Furthermore, in such a case, if any universal serial bus (USB) device is connected to a universal serial bus (USB) port of the portable computer, then standby current might flow through the universal serial bus (USB) port, causing battery power consumption.

U.S. Pat. No. 3,740,569 to Carcia entitled Direct-Current Power Supply System, discloses a plurality of voltage regulator circuits connected to a battery for producing regulated positive and negative output voltages of different values. A warning circuit is provided for causing a light emitting diode to blink when the battery voltage falls below a first value. It is disclosed an automatic shutdown circuit is provided for disabling the regulator circuits when the battery voltage falls below a second and lower value. It is also disclosed an overload circuit is provided for rapidly blowing a protective fuse when the output voltage of one of the regulator circuits exceeds a desired value.

U.S. Pat. No. 4,907,183 to Tanaka entitled Battery Powered Computer System herein a Power Supply Is Selectively Shut Off When a Low Battery Power Is Detected, discloses a method and apparatus for extending the battery life in a battery powered computer system having a high power consumption peripheral device, such as a hard disk. The energy state of the power supply battery is determined by a voltage detector. When the battery voltage drops to a level below which continued ooperation of the computer system will become unreliable or impossible, battery life is extended by de-energizing any high power consumption peripheral devices such as the hard disk, thereby providing an operator with additional time to store data or secure a backup power source.

U.S. Pat. No. 4,980,836 to Carter, et al., entitled Apparatus For Reducing Computer System Power Consumption, disclose a battery powered computer system that monitors the address bus to determine when selected peripheral devices have not been accessed for a preset amount of time. When the preset amount of time has passed the system powers itself down and stops the system clock, placing it in a standby mode. It is disclosed the system is awakened by depressing a standby switch, unless there is insufficient energy in the batteries, under which circumstances an AC power source must be connected before the system can be awakened.

U.S. Pat. No. 5,163,124 to Yabe, et al. entitled Method and Apparatus For Controlling Power To Device In A Computer System, disclose a personal portable computer system that includes peripheral devices such as a printer and a CRT which can be driven by a battery power source. It is disclosed the computer system includes a computer body which contains interface units and power supplied to the interface units is controlled. The interface units are disclosed as being used for supplying power to the peripheral devices.

U.S. Pat. No. 5,237,258 to Crampton entitled Unique Computer Power System With Backup Power, discloses a computer power system that includes an AC-to-DC power supply for providing DC power to the computer during the presence of AC line power and a backup power supply for providing DC power from batteries directly to the DC operated components of the computer system, completely bypassing the AC to DC power supply, when AC line voltage is absent or low.

U.S. Pat. No. 5,767,844 to Stoye entitled Modified Universal Serial Bus Interface Implementing Remote Pomer Up While Permitting Normal Remote Power Down, discloses a remote power key function that is implemented between a remote input device having a power key and a host computer system using a four lead USB interface. Normal functioning of the USB interface and of the input device are disclosed as not affected. It is disclosed an input device includes a remote logic circuit including a transistor, a diode, and a low voltage battery. It is disclosed the remote logic circuit and MPU receive a first input from the power key and the battery and receives a second input from the host-computer provided power supply that is "1" if the host computer is powered-up, and "0" otherwise. It is disclosed a remote logic circuit output is coupled to the D+ USB interface line, and MPU output is coupled to the D+ and D− interface lines. Clamping latch logic within the host computer it is disclosed has a first input that is the D+ line, and a second input that is the power supply "1" or "0" signal. Latch logic output is input to the latch input port of the host computer power supply. It is disclosed that when the host computer is to be powered-down, the remote logic circuit first input causes the MPU to output a scan code recognized by the host computer as commanding a power-down condition.

SUMMARY OF THE INVENTION

It is therefore an object of the present invention to provide a computer with universal serial bus (USB) ports, which has a reduced power consumption and an over-current protection function.

It is another object of the present invention to provide a method of controlling the power of a portable computer with universal serial bus (USB) ports for reducing power consumption and preventing damage from an over-current.

In order to attain the above and other objects of the present invention, according to an aspect of the present invention, there is provided a portable computer system with at least one universal serial bus (USB) port, powered by an alternating current (AC) adapter or a battery, comprising a memory, a detection circuit, a control circuit, and a switching circuit. In the memory, an enabled state or a disabled state of the universal serial bus (USB) ports are stored. The detection circuit detects whether power is supplied from the alternating current (AC) adapter or the battery. The switching circuit detects whether an over-current is supplied to the universal serial bus (USB) port from the alternating current (AC) adapter or the battery. The control circuit generates a first control signal in response to a detected result from the detection circuit and the stored state of the universal serial bus (USB) port, and generates a second control signal when the over-current is detected. The switching circuit shuts down the power supplied to the universal serial bus (USB) port in response to the first control signal and the second control signal.

According to another aspect of the present invention, there is provided a method for controlling power supplied to at least one universal serial bus (USB) port of a portable computer, comprising the steps of: detecting whether an alternating current (AC) adapter is connected to the portable computer for supplying the power; reading out an enabled state or a disabled state of the universal serial bus (USB) port from a memory such as a complimentary metal oxide semiconductor (CMOS) random access memory (RAM); generating a first control signal for shutting down the power or supplying the power to the universal serial bus (USB ) port in response to the detected result and the state of the universal serial bus (USB) port; generating a second control signal when an over-current is detected from the alternating current (AC) adapter or a battery to the universal serial bus (USB) port; and switching the power supplied to the universal serial bus (USB) port in response to the first control signal and the second control signal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Preferred embodiments of the present invention will be described in detail with reference to accompanying drawings.

Figure 1:
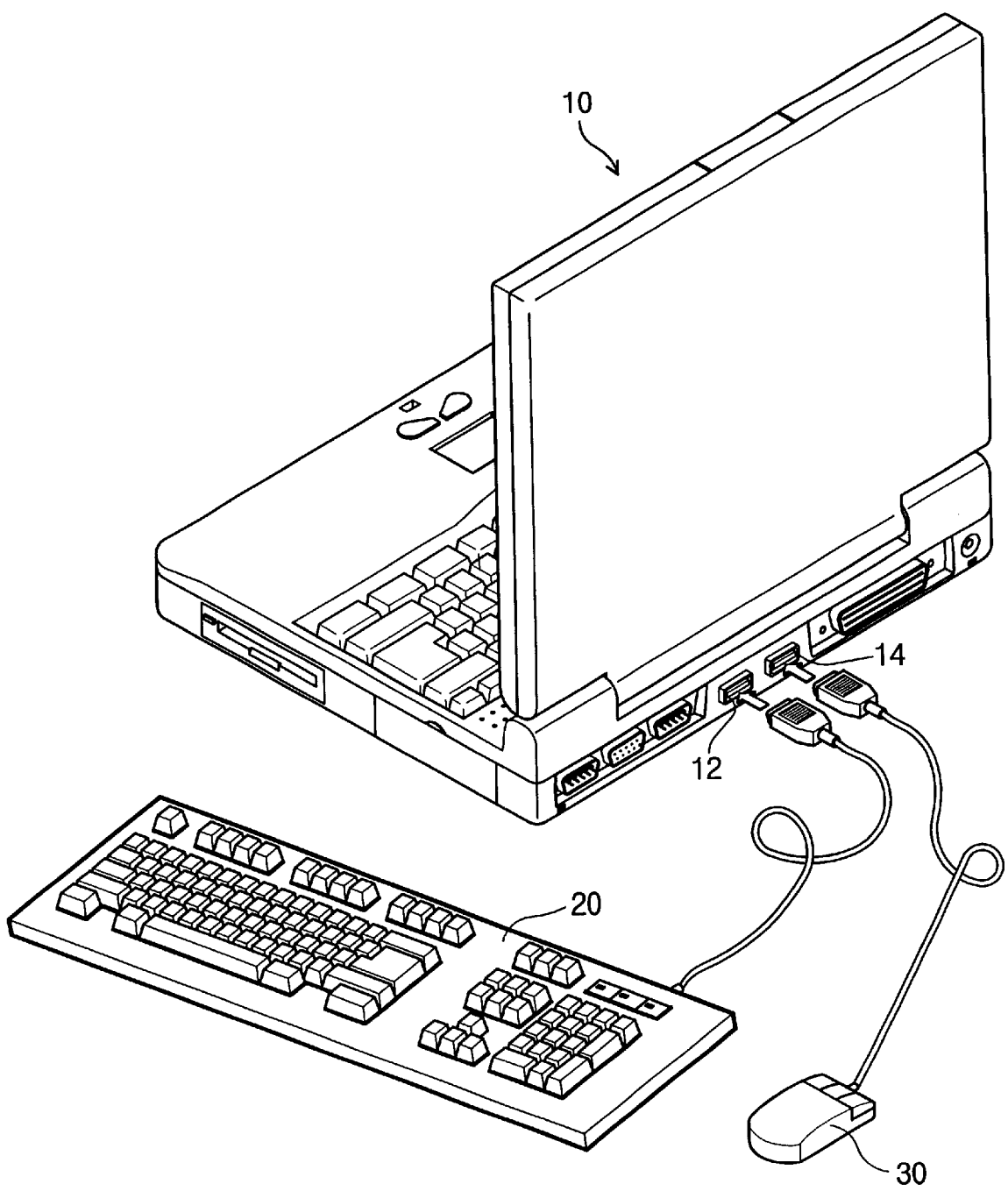
FIG. 1 is a perspective view illustrating a portable computer system exemplary of contemporary practice in the art having universal serial bus (USB) ports.

FIG. 1 illustrates a portable computer 10 exemplary of contemporary practice in the art, which incorporates a universal serial bus (USB) root hub including one or more universal serial bus (USB) ports 12 and 14. As is well known, universal serial bus (USB) devices are classified into self-powered devices and bus-powered devices. A self-powered universal serial bus (USB) device itself has a power source while a bus-powered universal serial bus (USB) device is supplied with power through a universal serial bus (USB) cable. The universal serial bus (USB) ports 12 and 14 of the universal serial bus (USB) root hub are connected with bus-powered universal serial bus (USB) devices 20 and 30, for example, universal serial bus (USB) keyboards, universal serial bus (USB) mouses and universal serial bus (USB) monitors, and are used to connect the specific additional functions to the computer 10.

The universal serial bus (USB) devices 20 and 30 implement the plug and play (PNP) function by use of the power supplied through the universal serial bus (USB) ports 12 and 14. If, however, the portable computer 10 is supplied with the power from a battery, then power management of the computer 10 is very important. Extending the use time of the battery is a significant factor for the portable computer 10. Since the portable computer 10 always supplies the power to the universal serial bus (USB) ports during use of the battery, the power is unnecessarily consumed although the universal serial bus (USB) devices are not used. Specifically, for a universal serial bus (USB) device, about 100 mA current flows through each universal serial bus (USB) port in a low power state, and about 500 mA current in a high power state.

Figure 2:
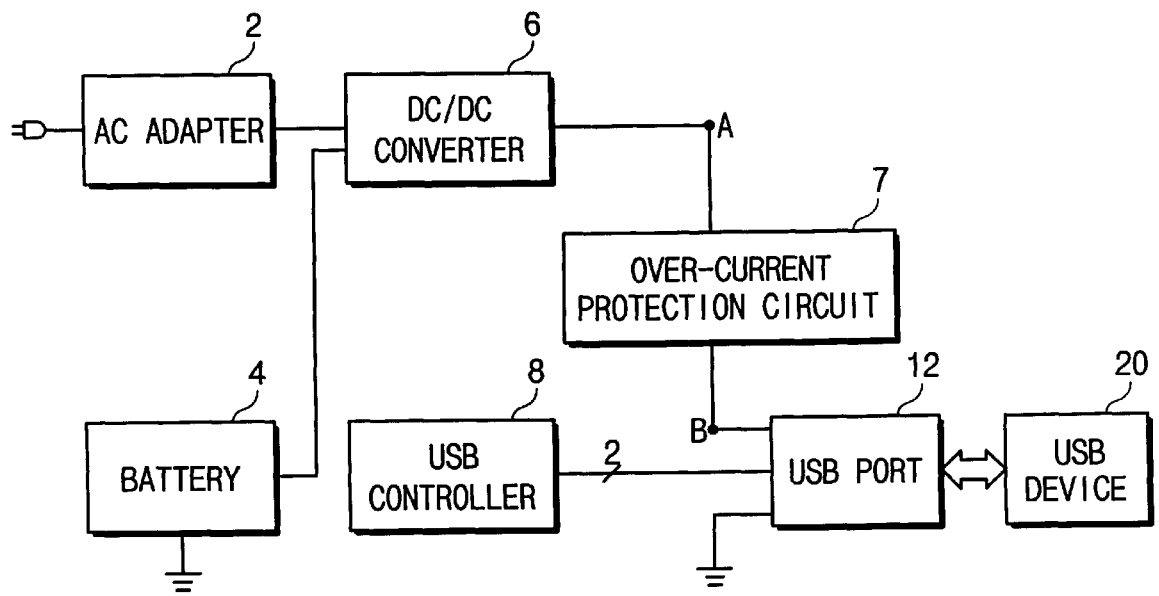
FIG. 2 is a schematic block diagram illustrating a circuit configuration of a portable computer system exemplary of contemporary practice in the art having at least one universal serial bus (USB) port.

FIG. 2 is a schematic block diagram which illustrates a circuit configuration of a portable computer system exemplary of contemporary practice in the art with a universal serial bus (USB) port including a universal serial bus (USB) controller 8 and a universal serial bus (USB) downstream port 12 that is connected with a universal serial bus (USB) device 20. Referring to FIG. 2, the portable computer is supplied with a direct current (DC) voltage from an alternating current (AC) adapter 2 or a battery 4 through a direct current (DC)/direct current (DC) converter 6. The universal serial bus (USB) device 20 is supplied with power from the computer via the universal serial bus (USB) port 12. In the event a universal serial bus (USB)-incompatible device is connected to the universal serial bus (USB) port 12 and so over-current flows from the direct current (DC)/direct current (DC) converter 6 to the universal serial bus (USB) port 12, an over-current protection circuit 7 blocks off the current path to the universal serial bus (USB) port 12.

Figure 3A:
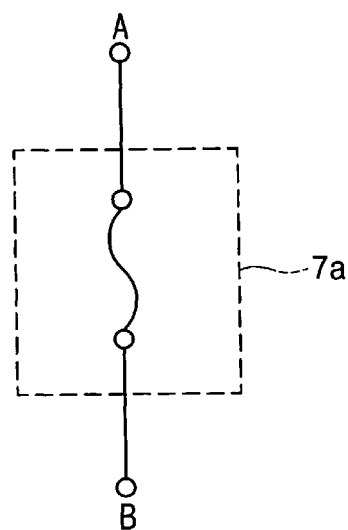
FIGS. 3A and 3B are circuit diagrams illustrating examples of the over-current protection circuit of FIG. 2.
Figure 3B:
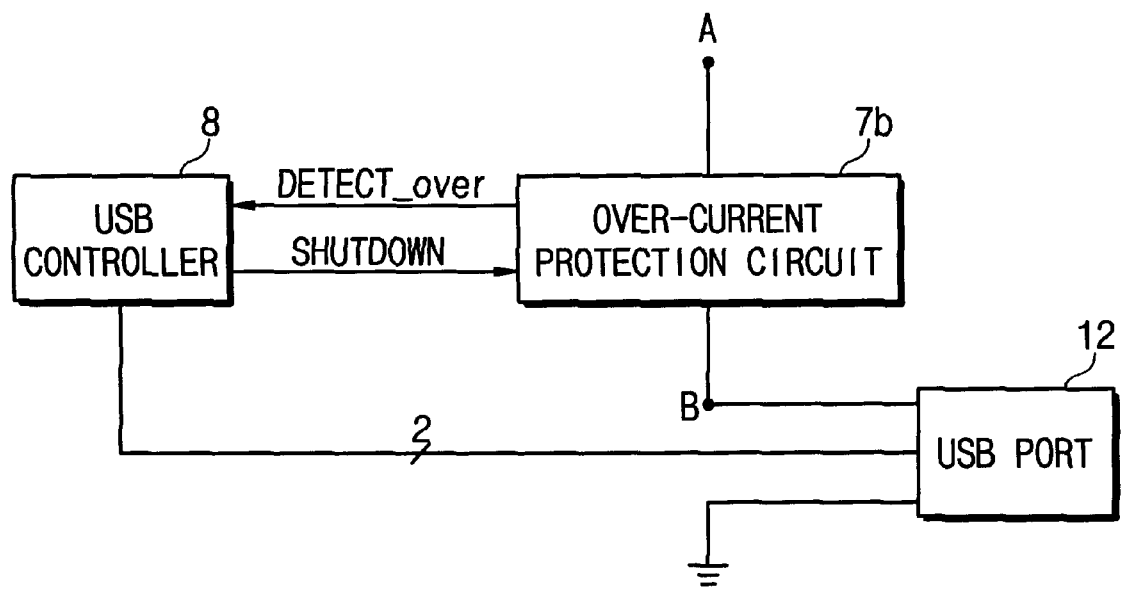

FIGS. 3A and 3B illustrate examples of the over-current protection circuit 7 of FIG. 2. As can be seen in FIGS. 3A and 3B, the over-current protection circuit 7 exemplary of contemporary practice in the art can perform the foregoing function by means of a fuse 7a or an intelligent over-current protection circuit 7b such as a microcontroller. The intelligent over-current protection circuit 7b detects whether the current supplied from the battery 4 or the alternating current (AC) adapter 2 through the direct current (DC)/direct current (DC) converter 6 to the universal serial bus (USB) port 12 is over-current and transmits detecting data DETECT_over to the universal serial bus (USB) controller 8. The universal serial bus (USB) controller 8 outputs a control signal SHUTDOWN when over-current flows, so that the intelligent over-current protection circuit 7b shuts the current path down.

Figure 4:
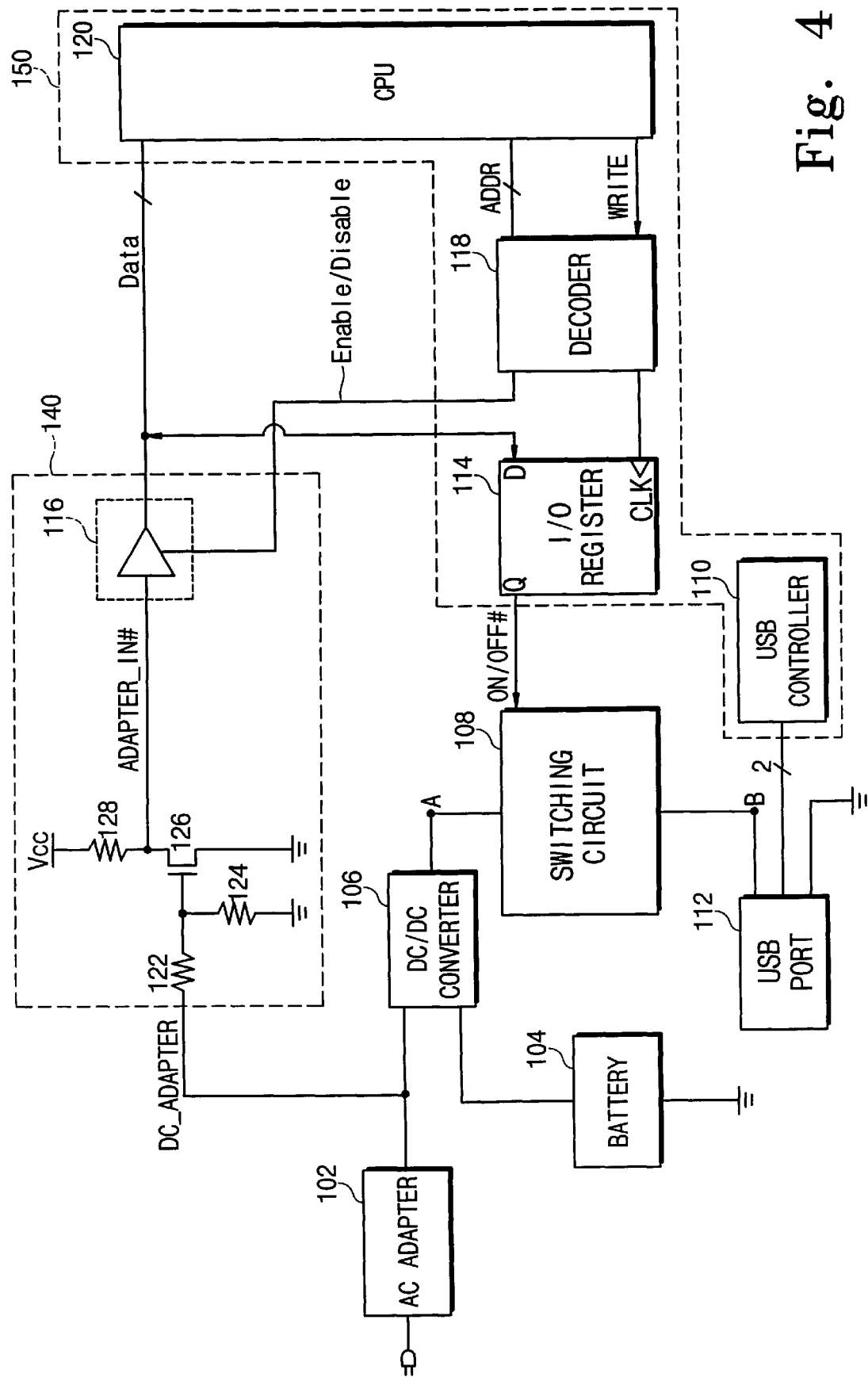
FIG. 4 is a block diagram illustrating a preferred embodiment of a portable computer system having a universal serial bus (USB) port according to the present invention.

FIG. 4 is a block diagram illustrating a preferred embodiment of a portable computer system 100 having one or more universal serial bus (USB) ports according to the present invention. The portable computer system 100 is powered by an alternating current (AC) adapter 102 or a battery 104, through a direct current (DC)/direct current (DC) converter 106. Referring to FIG. 4, the portable computer system 100 includes an adapter detection circuit 140, a control circuit 150, and a switching circuit 108.

The adapter detection circuit 140 includes a plurality of resistors 122, 124, and 128, a transistor 126, and a tristate buffer 116, the resistors 122, 124 and 128 being coupled to transistor 126. The tristate buffer 116 can be replaced with a microcontroller (referring to 116a of FIG. 6). The detection circuit 140 detects whether a main power of the portable computer system is supplied from an alternating current (AC) adapter 102 or not. When the alternating current (AC) adapter 102 is connected to the portable computer system, the transistor 126 generates an adapter detection signal ADAPTER_IN# activated to a logic low level ("0") in response to a direct current (DC) voltage DC_ADAPTER from the alternating current (AC) adapter 102 coupled to the resistor 122.

The control circuit 150 includes an input/output (I/O) register 114, a decoder 118, and a central processing unit (CPU) 120. The central processing unit (CPU) 120 determines whether the alternating current (AC) adapter 102 is coupled to the computer system 100 by receiving the adapter detection signal ADAPTER_IN# through a data line Data. In that case, if the alternating current (AC) adapter 102 is not connected to the computer system 100, the central processing unit (CPU) 120 generates an address ADDR and a write control signal WRITE to the decoder 118. The decoder 118 generates a disable control signal Disable and a clock signal CLK. Thus, the tristate buffer 116 of the adapter detection circuit 140 is disabled and the input/output (I/O) register 114 writes a switching data OFF by receiving the adapter detection signal ADAPTER_IN#. The switching data OFF is outputted to the switching circuit 108 in synchronism of the clock signal CLK as a first control signal ON/OFF#.

Central processing unit (CPU) 120 has a memory 120a, such as a complimentary metal oxide semiconductor (CMOS) random access memory (RAM), which stores an enabled state or a disabled state of the universal serial bus (USB) 112 port. The state of the universal serial bus (USB) port 112 is initially set to the memory 120a. The central processing unit (CPU) 120 determines whether the universal serial bus (USB) port 112 is enabled or disabled by reading out the setting state of the universal serial bus (USB) port 112 from the memory 120a. The central processing unit (CPU) 120 generates an address ADDR, and a write control signal WRITE to the decoder 118. The decoder 118 generates a clock signal CLK to the input/output (I/O) register 114 for writing the switching data to the input/output (I/O) register 114 in response to the address ADDR and the write control signal WRITE. In addition, the switching circuit 108 is controlled by the first control signal ON/OFF# from the input/output (I/O) register 114. Thus, the power supplied to the universal serial bus (USB) port 112 can be automatically shut down when the universal serial bus (USB) port 112 is disabled. As a result, power consumption of the portable computer system 100 can be reduced and damage to a peripheral device coupled to the universal serial bus (USB) port 112 can be prevented.

Figure 5A:
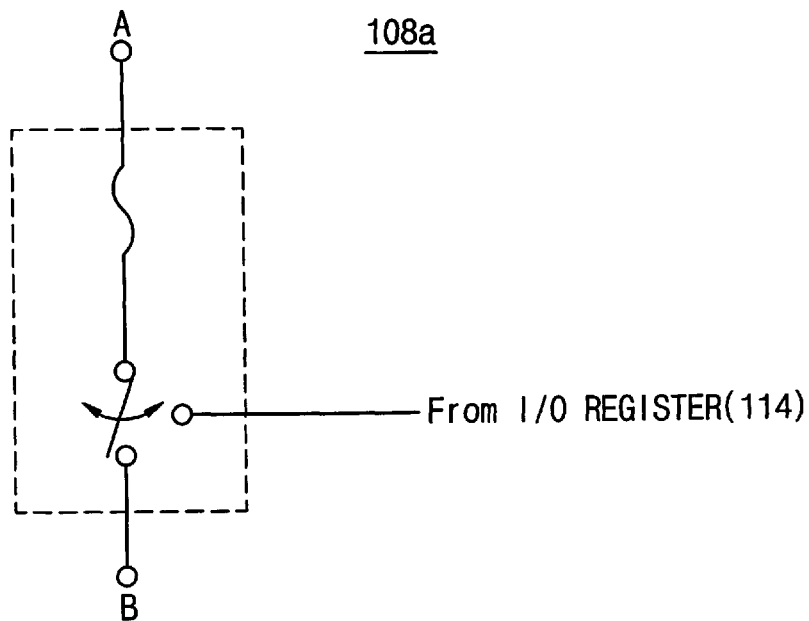
FIGS. 5A and 5B are circuit diagrams illustrating examples of a switching circuit of FIG. 4 according to the present invention.
Figure 5B:
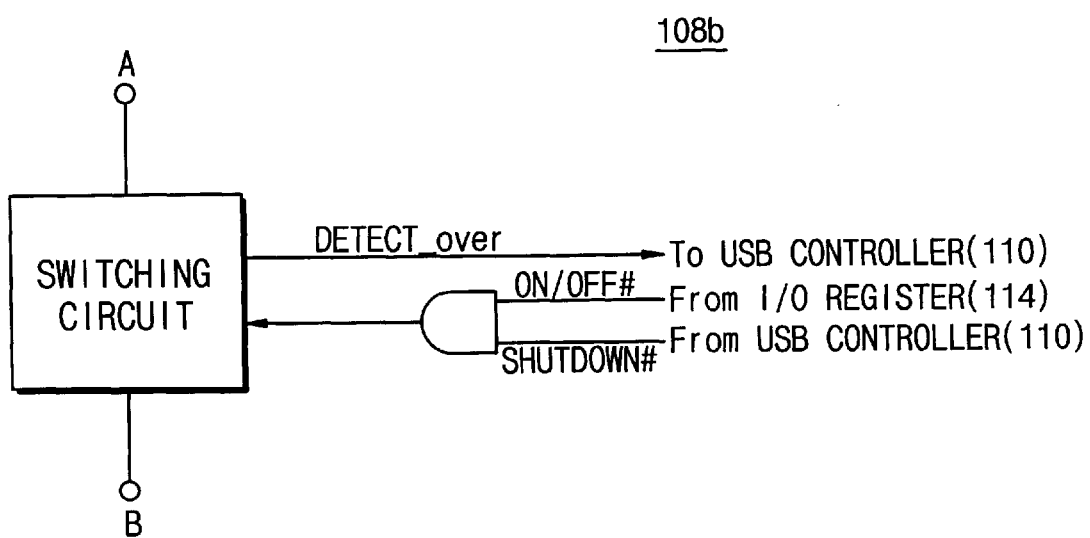

FIGS. 5A and 5B are circuit diagrams illustrating examples of a switching circuit 108 of FIG. 4 according to the present invention.

As shown in FIG. 5A, the switching circuit 108a includes an over-current protection device, for example a fuse 107, and a switch 109. When the over-current is provided to the universal serial bus (USB) ports, the fuse 107 is gone, so that the over-current is not provided to them. In addition, the switch 109 included in the switching circuit 108a is controlled by the first control signal ON/OFF# from the input/output (I/O) register 114. Thus, the power supplied to the universal serial bus (USB) port 112 can be automatically shut down when the main power of the portable computer system 100 is supplied from the battery 104. As a result, power consumption of the portable computer system 100 can be reduced and damage from the over-current can be prevented, automatically.

Referring to FIG. 5B, the switching circuit 108 can include an intelligent switching circuit 108b. The intelligent switching circuit 108b generates an over-current detection signal DETECT_over to universal serial bus (USB) controller 110 when the over-current supplied to the universal serial bus (USB) port 112 is detected. The universal serial bus (USB) controller 110 generates the second control signal SHUTDOWN# to the intelligent switching circuit 108b in response to the over-current detection signal DETECT_over from the intelligent switching circuit 108b. The intelligent switching circuit 108b switches the power supply of the universal serial bus (USB) port 112 by a logical AND operation of the first control signal ON/OFF# from the input/output (I/O) register 114 and the second control signal SHUTDOWN# from universal serial bus (USB) controller 110. Thus, when one of the control signals ON/OFF# and SHUTDOWN# is activated, the power of the universal serial bus (USB) port 112 is shut down. As a result, the power consumption of the portable computer system 100 can be reduced and damage to a peripheral device coupled to the universal serial bus (USB) port 112 can be prevented.

Figure 6:
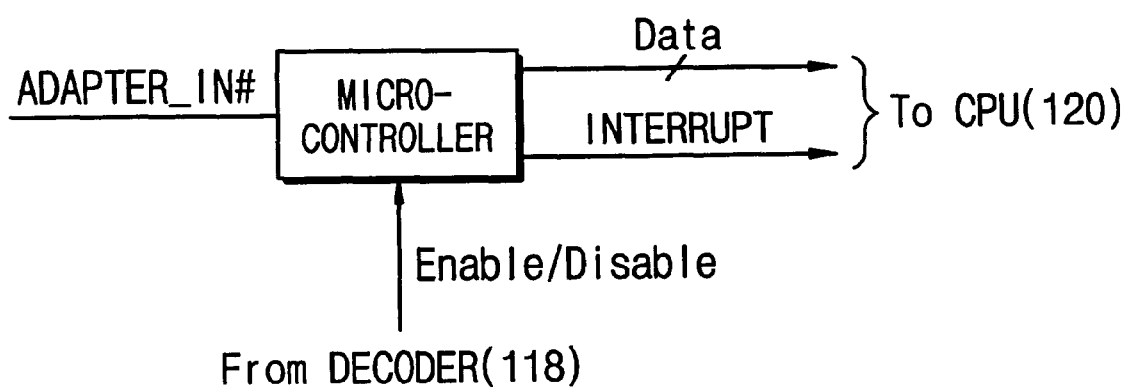
FIG. 6 is a circuit diagram illustrating a microcontroller for an adapter detection circuit of FIG. 4 according to the present invention.

FIG. 6 is a circuit diagram illustrating an example of a microcontroller 116a for an adapter detection circuit 140 of FIG. 4 according to the present invention. The tristate buffer 116 of the adapter detection circuit 140 can be replaced with the microcontroller 116a. The microcontroller 116a generates an interrupt signal INTERRUPT to the central processing unit (CPU) 120 in response to the adapter detection signal ADAPTER_IN#. The central processing unit (CPU) 120 generates an address ADDR and a write control signal WRITE to the decoder 118 so as to write the switching data ON or OFF to the input/output (I/O) register 114. As described above, the switching data ON or OFF is used as the first control signal for shutting down the power of the universal serial bus (USB) port 112.

Figure 7:
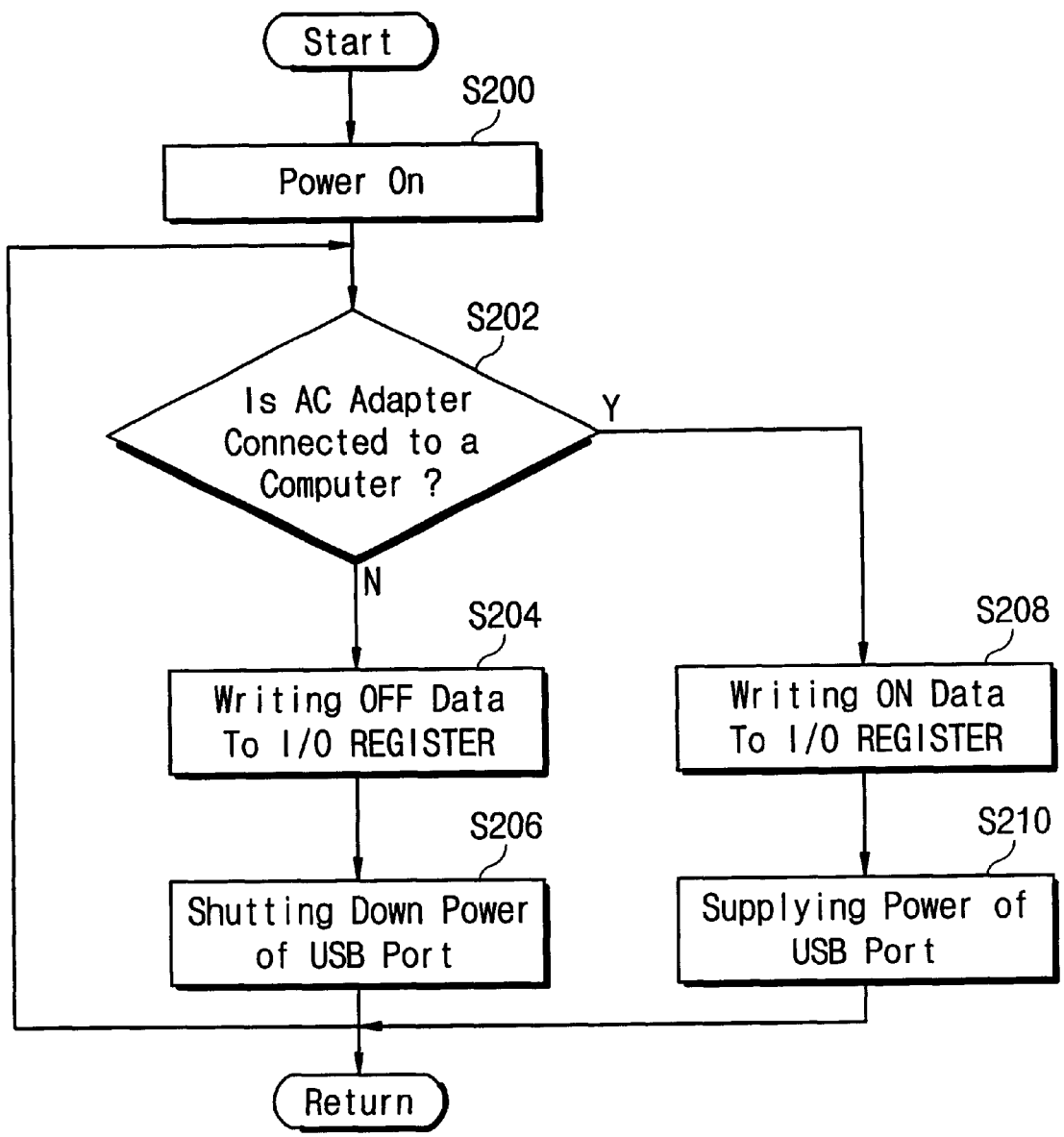
FIG. 7 is a flowchart illustrating a method for controlling power supplied to the universal serial bus (USB) port of FIG. 4 according to the present invention.

FIG. 7 is a flowchart illustrating a method for controlling power supplied to the universal serial bus (USB) port 112 of FIG. 4 according to the present invention.

Referring to FIG. 7, at step S200, the main power of the portable computer system 100 is supplied. At step S202, it is determined whether the alternating current (AC) adapter 102 is connected to the portable computer system 100. In other words, it is determined whether the main power of the portable computer system 100 is supplied from the alternating current (AC) adapter 102. If so, the adapter detection signal ADAPTER_IN# is activated to a logic low level ("0"). In that case, the control flow proceeds to step S208, wherein the central processing unit (CPU) 120 generates an address ADDR and a write control signal WRITE to the decoder 118 in order to write the switching data ON to the input/output (I/O) register 114. At step S210, the universal serial bus (USB) port 112 is provided power from the alternating current (AC) adapter 102. In addition, the switching circuit 108 detects whether an over-current is supplied to the universal serial bus (USB) port 112. When the over-current is detected, the switching circuit 108 shuts down the power of the universal serial bus (USB) port 112 immediately, for preventing damage to peripheral devices coupled to the universal serial bus (USB) port 112.

At step S202, if the main power of the portable computer system 100 is not being supplied by the alternating current (AC) adapter 102, the adapter detection signal ADAPTER_N# is activated to a logic high level ("1"). In that case, control flow proceeds to step S204, wherein the central processing unit (CPU) 120 generates the address ADDR and the write control signal WRITE to the decoder 118 in order to write the switching data OFF to the input/output (I/O) register 114. At step S206, the power of the universal serial bus (USB) port 112 is shut down so as to reduce power consumption, since the main power of the portable computer system 100 is provided by the battery 104. In addition, if the alternating current (AC) adapter 102 is connected to the computer system 100 while the main power of the portable computer system 100 is provided by the battery 104, the adapter detection signal ADAPTER_IN# is activated to the logic low level ("0"). Thus, the power of the universal serial bus (USB) port 112 is then supplied by the alternating current (AC) adapter 102.

Figure 8:
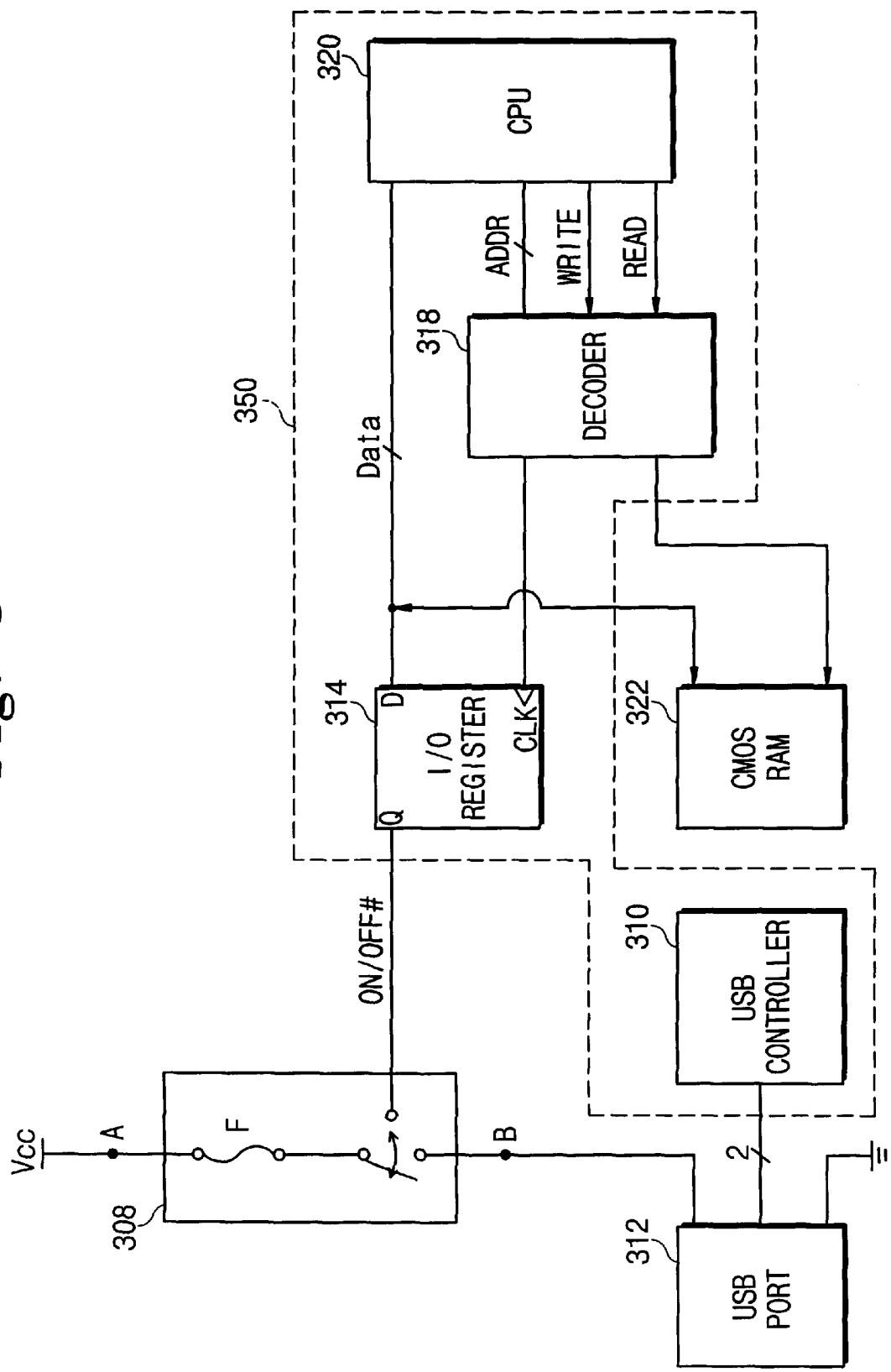
FIG. 8 is a block diagram illustrating another preferred embodiment of a portable computer system having at least one universal serial bus (USB) port according to the present invention.

FIG. 8 is a block diagram illustrating another preferred embodiment of a portable computer system 300 having one universal serial bus (USB) port 312 or a plurality of universal serial bus (USB) ports 312 according to the present invention. The portable computer system 300 is powered by an alternating current (AC) adapter 302 or a battery 304 connected to a direct current (DC)/direct current (DC) converter 306. The portable computer system 300 includes a memory 322, a control circuit 350, and a switching circuit 308, the switching circuit 308 being connected to the direct current (DC)/direct current (DC) converter 306.

The memory 322 is a complimentary metal oxide semiconductor (CMOS) random access memory (RAM), which stores an enabled state or a disabled state of the universal serial bus (USB) port 312. The state of the universal serial bus (USB) port 312 is initially set to the memory 322.

The control circuit 350 includes a universal serial bus (USB) controller 310, an input/output (I/O) register 314, a decoder 318, and a central processing unit (CPU) 320. The central processing unit (CPU) 320 determines whether the universal serial bus (USB ) port 312 is enabled or disabled by reading out the setting state of the universal serial bus (USB) port 312 from the memory 322. The central processing unit (CPU) 320 generates an address ADDR, a read control signal READ, and a write control signal WRITE, to the decoder 318. The decoder 318 generates a clock signal CLK to the input/output (I/O) register 314 for writing the switching data to the input/output (I/O) register 314 in response to the address ADDR and the write control signal WRITE. The decoder 318 generates a control signal for reading out the setting state of the universal serial bus (USB) port 312 from the memory 322 in response to the address ADDR and the read control signal READ.

The portable computer system 300 can also include an adapter detection circuit similar to adapter detection circuit 140 of FIGS. 4 and 6. The adapter detection circuit similarly detects whether a main power of the portable computer system 300 is supplied from an alternating current (AC) adapter 302 or not. The central processing unit (CPU) 320 determines whether the alternating current (AC) adapter 302 is coupled to the computer system 300 by receiving an adapter detection signal from the adapter detection circuit. In that case, if the alternating current (AC) adapter 302 is not connected to the computer system 300, the central processing unit (CPU) 320 generates an address ADDR and a write control signal WRITE to the decoder 318. The decoder 318 generates a disable control signal and a clock signal CLK. Thus, the input/output (I/O) register 314 writes a switching data OFF. The switching data OFF is outputted to the switching circuit 308 in synchronism of the clock signal CLK as a first control signal ON/OFF#.

The switching circuit 308 includes an over-current protection device, for example a fuse (F) 307, and a switch 309. When an over-current is provided to the universal serial bus (USB) port or ports 312, the fuse 307 is gone, so that the over-current is not provided to the universal serial bus (USB) port or ports 312. In addition, the switch 309 is controlled by the first control signal ON/OFF# from the input/output (I/O) register 314. Thus, the power supplied to the universal serial bus (USB) port 312 can be automatically shut down when the universal serial bus (USB) port 312 is disabled. As a result, power consumption of the portable computer system 300 can be reduced and damage to a peripheral device coupled to the universal serial bus (USB) port 312 can be prevented.

Figure 9:
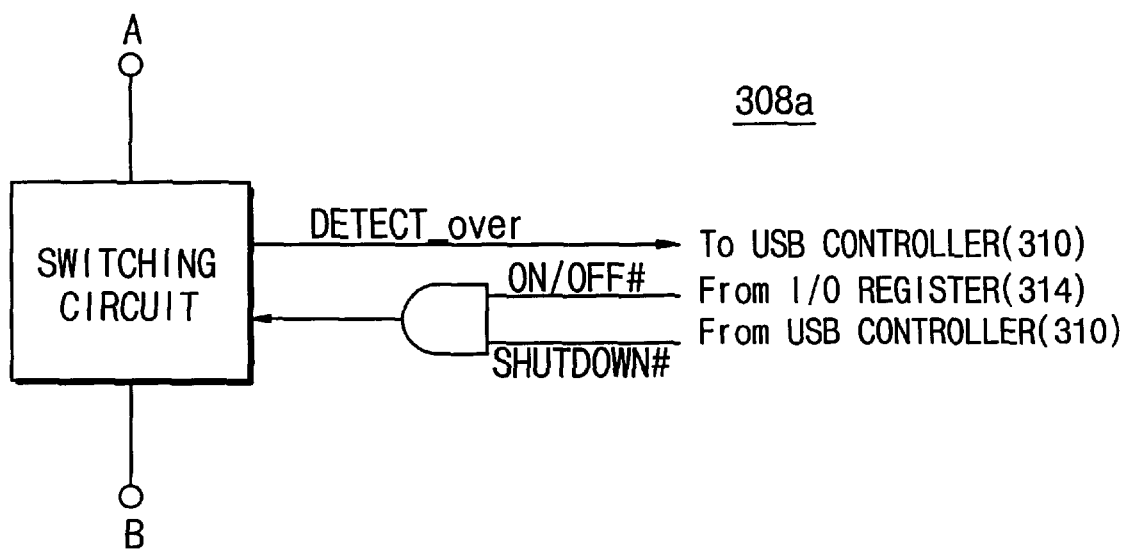
FIG. 9 is a circuit diagram of an example of a switching circuit of FIG. 8 according to the present invention.

FIG. 9 is a circuit diagram of another example of a switching circuit for switching circuit 308 of FIG. 8 according to the present invention.

Referring to FIG. 9, the switching circuit includes an intelligent switching circuit 308a. The intelligent switching circuit 308a generates an over-current detection signal DETECT_over to universal serial bus (USB) controller 310 when an over-current is supplied to the universal serial bus (USB) port 312. The universal serial bus (USB) controller 310 generates a second control signal SHUTDOWN# to the intelligent switching circuit 308a in response to the over-current detection signal DETECT_over. The intelligent switching circuit 308a receives the first control signal ON/OFF# from the input/output (I/O) register 314 and the second control signal SHUTDOWN# from the universal serial bus (USB) controller 310, and switches the power supply of the universal serial bus (USB) port 312 by a logical AND operation of the first control signal ON/OFF# and the second control signal SHUTDOWN#. Thus, when one of the control signals ON/OFF# and SHUTDOWN# is activated, the power of the universal serial bus (USB) port is shut down. As a result, the power consumption of the portable computer system 300 can be reduced and damage to a peripheral device coupled to the universal serial bus (USB) port 312 can be prevented.

Figure 10:
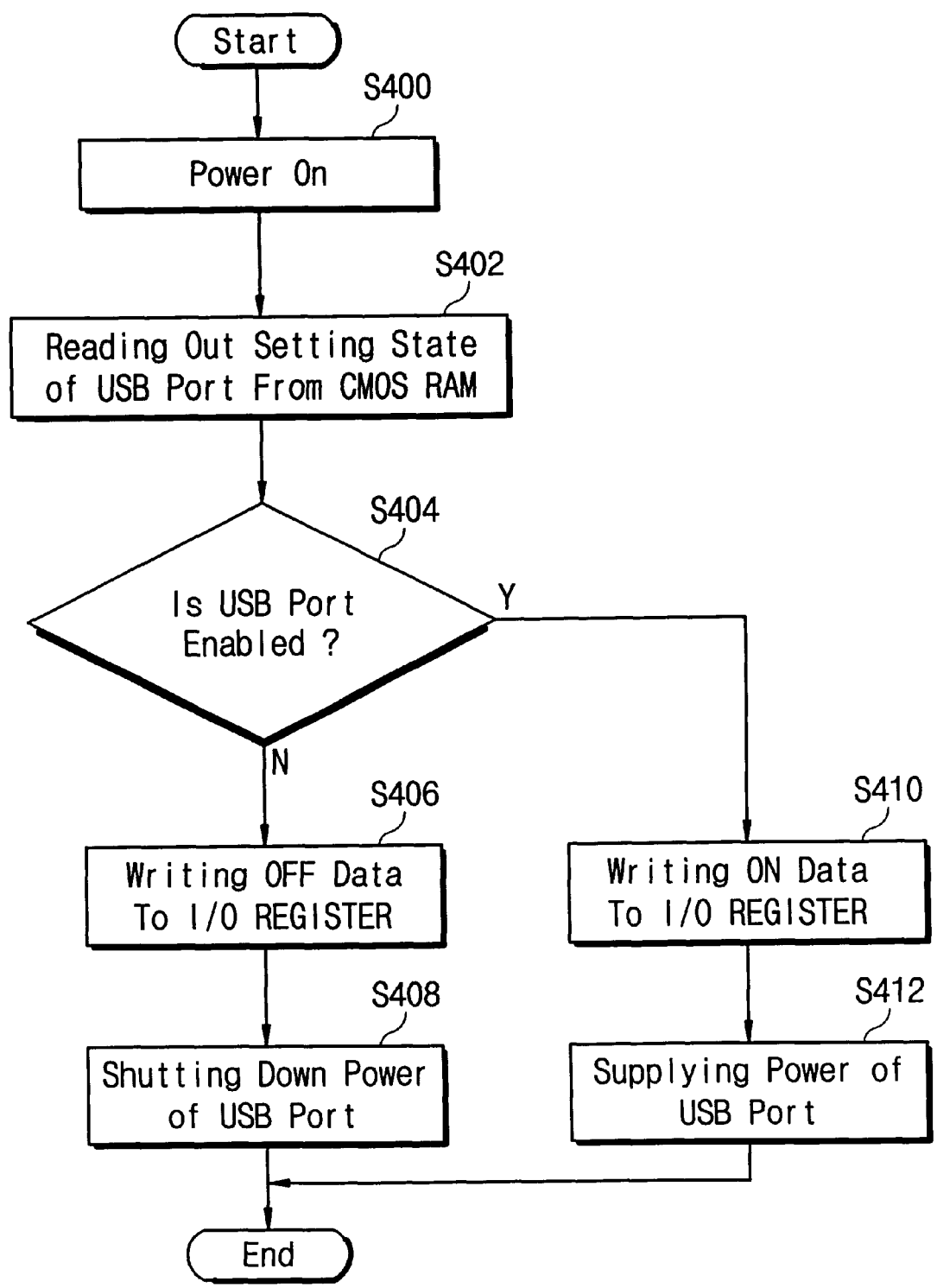
FIG. 10 is a flowchart illustrating another method for controlling power supplied to the universal serial bus (USB) port of FIG. 8 according to the present invention.

FIG. 10 is a flowchart illustrating another method for controlling power supplied to the universal serial bus (USB) port 312 of portable computer system 300 of FIG. 8 according to the present invention.

Referring to FIG. 10, at step S400, the main power of the portable computer system 300 is supplied from the alternating current (AC) adapter 302 or the battery 304. At step S402, the central processing unit (CPU) 320 generates the address ADDR and the read control signal READ to the decoder 318 in order to read the setting state of the universal serial bus (USB) port 312 from the memory 322, such as a complimentary metal oxide semiconductor (CMOS) random access memory (RAM). At step S404, it is determined whether the universal serial bus (USB) port 312 is enabled. If so, control flow proceeds to step S410, wherein the central processing unit (CPU) 320 generates the address ADDR and the write control signal WRITE to the decoder 318 in order to write the switching data ON to the input/output (I/O) register 314. At step S412, the power of the universal serial bus (USB) port 312 is provided from the alternating current (AC) adapter 302 or the battery 304. In addition, the switching circuit 308 detects whether an over-current is supplied to the universal serial bus (USB) port 312. When the over-current is detected, the switching circuit 308 shuts down the power of the universal serial bus (USB) port 312 immediately, for preventing damage to peripheral devices coupled to the universal serial bus (USB) port 312.

At step S404, if the universal serial bus (USB) port 312 is not enabled, control flow proceeds to step S406, wherein the central processing unit (CPU) 320 generates the address ADDR and the write control signal WRITE to the decoder 318 in order to write the switching data OFF to the input/out (I/O) register 314. At step S408, the power of the disabled universal serial bus (USB) port 312 is shut down.

According to the present invention, a connecting state of an alternating current (AC) adapter or a battery is detected so as to automatically supply or alternatively shut down power of the universal serial bus (USB) port, thereby reducing unnecessary power consumption when the main power of the portable computer system is supplied by the battery.

In addition, according to present invention, unnecessary current flow in a universal serial bus (USB) port is completely shutdown while the universal serial bus (USB) port is not used in response to the setting state of the universal serial bus (USB) port, thereby reducing unnecessary power consumption.

Further, according the present invention, when an over-current is detected from the alternating current (AC) adapter or the battery, the power of the universal serial bus (USB) port is shut down, whereby damage to peripheral devices coupled to the universal serial bus (USB) port or ports can be prevented.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A portable computer system, comprising:
 a universal serial bus (USB) port that is selectively supplied power from any one of an alternating current (AC) adapter and a battery;
 detection means for detecting whether the alternating current (AC) adapter is connected to the portable computer system to supply power and generating a detection signal indicating a detected result as to whether the alternating current (AC) adapter is connected to the portable computer system to supply power;
 storing means for storing one of enabled state and a disabled state as a state of the universal serial bus (USB) port;
 over-current detection means for any one of generating an over-current detection signal and shutting down power supplied to the universal serial bus (USB) port when detecting an over-current from any one of the alternating current (AC) adapter and the battery;

control means for generating a first control signal in response to the detection signal and the state of the universal serial bus (USB) port and generating a second control signal in response to the over-current detection signal, so as to selectively supply power and shut down power supplied to the universal serial bus (USB) port; and switching means for selectively supplying power and shutting down the power supplied to the universal serial bus (USB) port in response to any one of the first control signal and the second control signal.

2. The portable computer system of claim 1, further comprised of the detection means comprising:

a plurality of resistors;

a transistor for generating the detection signal to indicate whether the alternating current (AC) adapter is connected to the portable computer system, the transistor being coupled to the plurality of resistors; and a tristate buffer for receiving and transmitting the detection signal to the control means.

3. The portable computer system of claim 1, further comprised of the detection means comprising:

a plurality of resistors;

a transistor for generating the detection signal to indicate whether the alternating current (AC) adapter is connected to the portable computer system, the transistor being coupled to the plurality of resistors; and a microcontroller for receiving the detection signal and selectively generating an interrupt signal to the control means.

4. The portable computer system of claim 1, further comprised of the storing means including a complementary metal oxide semiconductor (CMOS) random access memory (RAM).

5. The portable computer system of claim 1, further comprised of the control means comprising:

an input/output (I/O) register for receiving switching data and outputting the switching data as the first control signal so as to selectively shut down and supply power to the universal serial bus (USB) port;

a central processing unit (CPU) for generating an address and control signals so as to read out the state of the universal serial bus (USB) port from the storing means and write the switching data to the input/output (I/O) register in response to the detection signal and the state of the universal serial bus (USB) port;

decoding means for enabling the detection means and generating a clock signal to the input/output (I/O) register in response to the address and the control signals from the central processing unit (CPU); and a universal serial bus (USB) controller for generating the second control signal in response to the over-current detection signal from the over-current detection means.

6. The portable computer system of claim 1, further comprised of the over-current detection means comprising an over-current protection circuit for generating the over-current detection signal, when the over-current is detected from any one of the alternating current (AC) adapter and the battery.

7. The portable computer system of claim 1, further comprised of the over-current detection means comprising an over-current protection device including a fuse for shutting down the power to the universal serial bus (USB) port, when the over-current is detected from any one of the alternating current (AC) adapter and the battery.

8. A portable computer system, comprising:

a universal serial bus (USB) port that is selectively supplied power from any one of an alternating current (AC) adapter and a battery;

detection means for detecting whether the alternating current (AC) adapter is connected to the portable computer system to supply power and generating a detection signal indicating a detected result as to whether the alternating current (AC) adapter is connected to the portable computer system to supply power;

over-current detection means for any one of generating an over-current detection signal and shutting down power supplied to the universal bus (USB) port when detecting an over-current from any one of the alternating current (AC) adapter and the battery;

control means for generating a first control signal in response to the detection signal and generating a second control signal in response to the over-current detection signal, so as to selectively supply power and shut down power supplied to the universal serial bus (USB) port; and switching means for selectively supplying power and shutting down the power supplied to the universal serial bus (USB) port in response to any one of the first control signal and the second control signal.

9. The portable computer system of claim 8, further comprised of the detection means comprising:

a plurality of resistors;

a transistor for generating the detection signal to indicate whether the alternating current (AC) adapter is connected to the portable computer system, the transistor being coupled to the plurality of resistors; and a tristate buffer for receiving and transmitting the detection signal to the control means.

10. The portable computer system of claim 8, further comprised of the detection means comprising:

a plurality of resistors;

a transistor for generating the detection signal to indicate whether the alternating current (AC) adapter is connected to the portable computer system, the transistor being coupled to the plurality of resistors; and a microcontroller for receiving the detection signal and selectively generating an interrupt signal to the control means.

11. The portable computer system of claim 8, further comprised of the control means comprising:

an input/output (I/O) register for receiving switching data and outputting the switching data as the first control signal so as to selectively shut down and supply power to the universal serial bus (USB) port;

a central processing unit (CPU) for generating an address and a control signal so as to write the switching data to the input/output (I/O) register in response to the detection signal;

decoding means for enabling the detection means and generating a clock signal to the input/output (I/O) register in response to the address and the control signal from the central processing unit (CPU); and a universal serial bus (USB) controller for generating the second control signal in response to the over-current detection signal from the over-current detection means.

12. The portable computer system of claim 8, further comprised of the over-current detection means comprising an over-current protection circuit for generating the overcurrent detection signal when the over-current is detected from any one of the alternating current (AC) adapter and the battery.

13. The portable computer system of claim 8, further comprised of the over-current detection means comprising an over-current protection device including a fuse for shutting down the power to the universal serial bus (USB) port, when the over-current is detected from any one of the alternating current (AC) adapter and the battery.

14. A portable computer system, comprising:
a universal serial bus (USB) port that is selectively supplied power from any one of an alternating current (AC) adapter and a battery;
storing means for storing one of an enabled state and a disabled state as a state of the universal serial bus (USB) port;
over-current detection means for any one of generating an over-current detection signal and shutting down power supplied to the universal serial bus (USB) port when detecting an over-current from any one of the alternating current (AC) adapter and the battery;
control means for generating a first control signal in response to the state of the universal serial bus (USB) port and generating a second control signal in response to the over-current detection signal, so as to selectively supply power and shut down power supplied to the universal serial bus (USB) port; and
switching means for selectively supplying power and shutting down the power supplied to the universal serial bus (USB) port in response to any one of the first control signal and the second control signal.

15. The portable computer system of claim 14, further comprised of the storing means including a complimentary metal oxide semiconductor (CMOS) random access memory (RAM).

16. The portable computer system of claim 14, further comprised of the control means comprising:
an input/output (I/O) register for receiving switching data and outputting the switching data as the first control signal so as to selectively shut down and supply power to the universal serial bus (USB) port;
a central processing unit (CPU) for generating an address and control signals so as to read out the state of the universal serial bus (USB) port from the storing means and write the switching data to the input/output (I/O) register in response to the state of the universal serial bus (USB) port;
decoding means for generating a clock signal to the input/output (I/O) register and generating a control signal for reading out from the storing means the state of the universal serial bus (USB) port in response to the address and the control signals from the central processing unit (CPU); and
a universal serial bus (USB) controller for generating the second control signal in response to the over-current detection signal from the over-current detection means.

17. The portable computer system of claim 14, further comprised of the over-current detection means comprising an over-current protection circuit for generating the over-current detection signal when the over-current is detected from any one of the alternating current (AC) adapter and the battery.

18. The portable computer system of claim 14, further comprised of the over-current detection means including a fuse as an over-current protection device for shutting down the power to the universal serial bus (USB) port when the over-current is detected from any one of the alternating current (AC) adapter and the battery.

19. A method for controlling power supplied to a universal serial bus (USB) port of a portable computer, comprising the steps of:
determining whether an alternating current (AC) adapter is connected to the portable computer for supplying power;
reading out one of an enabled state and a disabled state as a state of the universal serial bus (USB) port from a storing means that stores the state of the universal serial bus (USB) port;
generating a first control signal for selectively shutting down and supplying power to the universal serial bus (USB) port in response to a result of the determining step and the state of the universal serial bus (USB) port;
generating a second control signal when an over-current is detected from any one of the alternating current (AC) adapter and a battery so as to selectively shut down power supplied to the universal serial bus (USB) port; and
switching selectively between supplying power and shutting down the power supplied to the universal serial bus (USB) port in response to any one of the first control signal and the second control signal.

20. A method for controlling power supplied to a universal serial bus (USB) port of a portable computer, comprising the steps of:
determining whether an alternating current (AC) adapter is connected to the portable computer for supplying power;
generating a first control signal for selectively shutting down and supplying power to the universal serial bus (USB) port in response to a result of the determining step;
generating a second control signal when an over-current is detected from any one of the alternating current (AC) adapter and a battery so as to selectively shut down power supplied to the universal serial bus (USB) port; and
switching selectively between supplying power and shutting down the power supplied to the universal serial bus (USB) port in response to any one of the first control signal and the second control signal.

21. A method for controlling power supplied to a universal serial bus (USB) port of a portable computer, comprising the steps of:
reading out one of an enabled state and a disabled state as a state of the universal serial bus (USB) port from a storing means that stores the state of the universal serial bus (USB) port;
generating a first control signal for selectively shutting down and supplying power to the universal serial bus (USB) port in response to the state of the universal serial bus (USB) port;
generating a second control signal when an over-current is detected from any one of an alternating current (AC) adapter and a battery so as to selectively shut down power supplied to the universal serial bus (USB) port; and
switching selectively between supplying power and shutting down the power supplied to the universal serial bus (USB) port in response to any one of the first control signal and the second control signal.

* * * * *